Aug. 28, 1934.  H. W. CHADBOURNE  1,971,811
CONTROL SYSTEM
Filed July 20, 1933
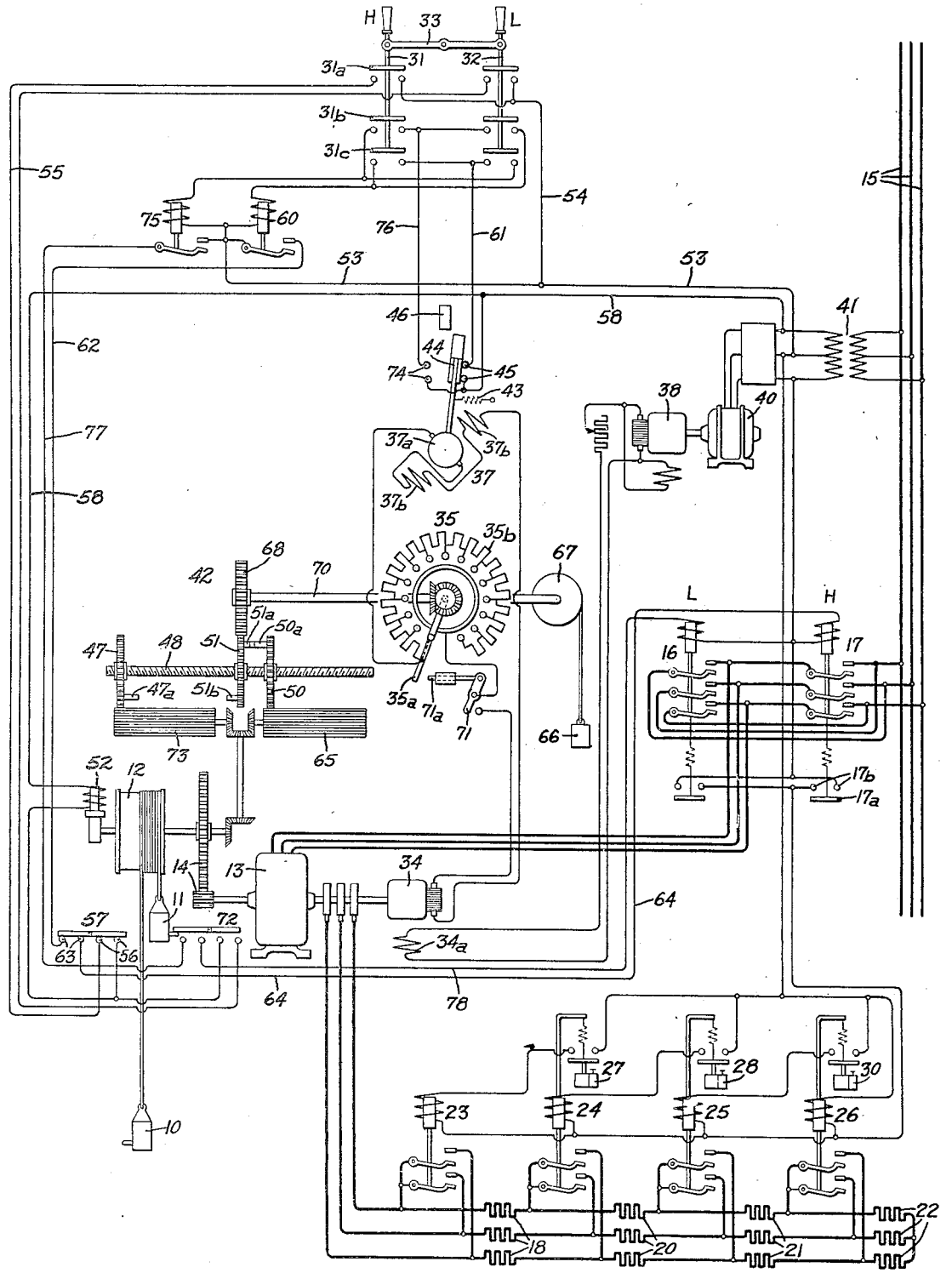
Inventor:
Henry W. Chadbourne,
by Harry E. Dunham
His Attorney.

Patented Aug. 28, 1934

1,971,811

UNITED STATES PATENT OFFICE 1,971,811

CONTROL SYSTEM

Henry W. Chadbourne, Scotia, N. Y., assignor to General Electric Company, a corporation of New York Application July 20, 1933, Serial No. 681,287

9 Claims. (Cl. 172—152)

This invention relates to control systems; more particularly to systems for controlling the operation of electric motors and it has for an object the provision of a simple, reliable and improved system of this character.

In one of its aspects, the invention relates to a control system for automatically retarding an induction motor-driven mine hoist equipment and a specific object is the provision of means for accurately bringing the cage of the hoist to rest at a given landing point irrespective of the load.

The invention is carried into effect in one form thereof by the provision of means for producing a control voltage that is variable in accordance with the speed of the driving motor and the total amount of rotation thereof, together with means controlled by this control voltage for controlling the operation of the driving motor itself. In a specific embodiment, the control voltage is produced by a generator driven by the driving motor so that the generated voltage of the generator is proportional to the speed of the driving motor. A variable resistance is included in the circuit of the generator and is varied in accordance with the position of an element driven by the motor during a predetermined zone of the travel of the driven element; for example, the landing zone of a hoist cage, and a device responsive to this modified voltage is provided for controlling the driving and plugging torques of the driving motor so that a predetermined deceleration is effected irrespective of the load on the motor.

In illustrating the invention in one form thereof, it is shown as applied to a mine hoisting equipment of the type in which the cables of two cages are so wound upon a single drum that one cage is raised at the same time that the other is lowered.

For a better and more complete understanding of the invention, reference should now be had to the following specification and to the accompanying drawing, the single figure of which is a simple diagrammatic illustration of an embodiment of the invention.

Referring now to the drawing, the cables of two mine hoist cages 10 and 11 respectively are arranged upon a winding drum 12 in such a manner that as the drum is rotated in one direction one of the cages is raised and the other is lowered, whilst when the drum is rotated in the opposite direction the first cage is lowered and the second is raised. The winding drum 12 is driven by any suitable means, such for example as the electric motor 13 to the drive shaft of which the drum is connected by suitable gearing 14. Although the motor 13 may be of any suitable type, it is illustrated as an alternating-current motor of the wound-rotor induction type. This motor is supplied with power from a suitable source represented in the drawing by the three supply lines 15 to which the terminals of the primary winding of the motor are arranged to be connected by suitable reversing switching means illustrated as electromagnetic contactors 16 and 17. When the contactor 16 is closed, the motor 13 is energized to effect lowering of the cage 10 whilst when the contactor 17 is operated to its closed position, the motor 13 rotates in the opposite direction to effect hoisting of the cage. Consequently these contactors 16 and 17 are respectively designated L and H to indicate the directions of travel of the hoist 10 when either of these contactors is closed.

Acceleration of the motor 13 from rest to full speed is provided by means of secondary resistance sections 18, 20, 21, and 22 which are arranged to be successively short circuited by means of the secondary contactors 23, 24, 25, and 26. The successive closing of these contactors may be controlled either by a current limit control system or a time delay control system. In the embodiment illustrated in the drawing, these contactors are controlled by time delay devices 27, 28, and 30 which produce a predetermined time delay between the successive closings of the contactors.

The starting of the motor 13 when the cage 10 is at the bottom of the shaft is initiated by a master switch 31 illustrated as being of the push-button type and which when operated to its lower closed position causes the hoisting contactor 17 to connect the motor to the source for rotation in the hoisting direction. A similar master switching device 32 is provided for starting the equipment when the cage 10 is at its top landing. Mechanical interlocking means 33 prevent both master switches 31 and 32 being depressed at the same time.

In order to effect a predetermined deceleration of the driving motor 13 irrespective of the load when the cages 10 and 11 are in their landing zones, means are provided for controlling the driving and plugging torques of the driving motor 13 in such a manner that the speed of the motor 13 is caused to follow a predetermined slow-down curve such that for each position of the cages in the landing zones, the motor 13 has a predetermined instantaneous speed. These means are illustrated as comprising a means 34 for producing a control voltage proportional to the speed of the driving motor 13, a means 35 for modifying this control voltage in accordance with the position of the cages 10, 11 in their landing zones, and a voltage-responsive device 37 for controlling the lowering and hoisting contactors 16 and 17. The means 34 is preferably a small tachometer generator having its armature member connected to the drive shaft of the driving motor 13 or otherwise suitably connected to be driven in accordance with the speed of the motor 13. As shown, the tachometer generator 34 is provided with a field winding 34a which is separately excited from the source 15 to which it is connected by means of a small motor-generator set illustrated as comprising direct-current generator 38 driven by an alternating-current motor 40 which in turn is connected to the supply source 15 by means of a suitable transformer 41. The motor 40 drives the generator 38 at a substantially constant speed with the result that a substantially constant excitation is provided for the generator 34. Consequently the control voltage generated by the generator 34 is substantially proportional to the speed of the driving motor 13.

The means 35 for modifying the control voltage supplied by the generator 34 is illustrated as a regulating rheostat, the movable contact 35a of which is connected to the shaft of the winding drum 12 or alternatively to the drive shaft of the driving motor 13 by means of suitable "fleeting" gearing indicated generally at 42. The arrangement of this gearing is such that when either of the cages enters a landing zone, the movable contact 35a is actuated to vary the resistance of the rheostat in such a manner that the control voltage generated by the generator 34 is modified in accordance with the instantaneous position of the cage in its landing zone. Preferably the resistance member 35b of the rheostat is so designed that the ultimate deceleration produced by the system is substantially constant. In other words, the ohmic value between steps of the resistance member is progressively varied.

Although the device 37 may be of any suitable well-known form, it is herein illustrated as a voltage-responsive relay in the form of a torque motor comprising an armature member 37a and cooperating field windings 37b connected in circuit with the armature of the generator 34 and the resistance 35b. Rotation of the armature member 37a is restricted by means of a spring 43 so that the contact member 44 carried on the shaft of the torque motor is normally urged into engagement with right-hand stationary contacts 45. However, a magnet preferably in the form of a permanent magnet 46 is provided for preventing oscillation or vibration of the contact member 44 when it is operated to its central position.

With the above understanding of the elements and apparatus and their organization in the completed system, the operation of the system itself will readily be understood from the following detailed description. The apparatus is illustrated in its normally open deenergized condition with the cage 10 at the bottom of the shaft. In this condition, the driven gear 47 of the fleeting gearing is in the extreme left-hand position on the lead screw 48, whilst the gear 50 is in the central position on the lead screw with the pin 50a in engagement with the pin 51a of a pinion 51 mounted loosely on the lead screw 48.

The hoisting operation of the cage, is initiated by depressing the master push-button 31 to its lower closed position in which its upper auxiliary movable contact member 31a completes an energizing circuit for the operating coil 52 of the solenoid for the mechanical brake. This circuit is traced from the midtap of the secondary winding of the transformer 41 through conductors 53 and 54, upper stationary contacts of the master switch 31 bridged by the contact member 31a, conductor 55, stationary contacts 56 bridged by the right-hand section of the movable contact member of limit switch 57, operating coil of the brake, and thence by conductor 58 to the upper terminal of the secondary winding of transformer 41. As a result of the energization of its operating solenoid, the brake shoe is released from engagement with the brake drum against the tension of the operating spring or weight (not shown). Simultaneously, an energizing circuit is established for the operating coil of the hoist relay 60 which circuit is traced from the upper terminal of the transformer 41 by the conductor 58, stationary contact 45 (bridged by movable contact member 44) conductor 61, lower contact of master switch 31 bridged by movable contact member 31c, operating coil of relay 60, and thence by conductor 53 to the midtap of transformer 41.

Relay 60 in responding to the energization of its operating coil closes its contacts to complete an energizing circuit for the operating coil of the primary hoist contactor 17. This circuit is traced from the midtap of the transformer 41 through conductor 53, contact of relay 60, conductor 62, stationary contact 63 of limit switch 57 bridged by left-hand movable contact section, conductor 64, operating coil of contactor 17 to the lower terminal of transformer 41. In responding to the energization of its operating coil, contactor 17 closes to connect the primary terminals of the driving motor 13 to the supply source 15 for rotation of the motor in the direction to hoist the cage 10. The closing of contactor 17 effects the engagement of a movable auxiliary contact member 17a with the stationary contact 17b to complete an energizing circuit of the operating coil of accelerating contactor 26. This circuit is obvious and requires no tracing. The contactor 26 closes to short circuit resistance section 22, thereby increasing the motor speed. After a predetermined interval of time determined by the setting of the time delay device 30, an energizing circuit is established for the operating coil of the next succeeding accelerating contactor 25 which circuit is also obvious and requires no tracing. As a result the contactor 25 is closed to short circuit resistance section 21, thereby further increasing the speed of the motor. In a similar manner, the contacts 24 and 23 are successively closed to short circuit resistance sections 20 and 18 with suitable time intervals included in the closing operations of the contactors, the duration of which time intervals are determined by the settings of time delay devices 28 and 27 respectively. When the final resistance section 18 is short-circuited, the driving motor 13 comes up to full speed.

As the driving motor 13 started from rest, the elongated gear 65 initiated rotation of the gear member 50 in such a direction that the gear 50 was moved to the right along the lead screw 48. Rotation of the gear member 50 permits the loosely mounted pinion 51 to be rotated in the same direction by means of the weight 66 and drum 67 to which the pinion 51 is connected by means of the gear 68 and shaft 70. Since the movable contact member 35a of the regulating resistance 35 is connected by means of suitable bevel gearing to the shaft 70, the contact member is moved from the left-hand limiting position in which it is illustrated in the clockwise direction. After a predetermined rotation of the motor 13, usually an amount corresponding with the landing zone of the cage 10, the contact arm 35a is rotated to its extreme right-hand position in which it snaps the movable contact member of the switch 71 into engagement with its cooperating stationary contact, thereby completing a circuit from the armature terminals of the generator 34 through the resistance 35b to the terminals of the torque motor 37. It is observed that with the contact member 35a in its extreme right-hand position, the entire amount of the resistance 35b is included in the circuit between the generator 34 and the torque motor 37. The total ohmic resistance of this resistance section 35b is sufficiently great to limit the current supplied to the torque motor 37 to an amount less than the amount required to operate the motor and consequently the movable contact member 44 is retained in engagement with its cooperating stationary contacts 45 by means of the spring 43.

As the cage 11 started its descent, the movable member of the limit switch 72 was permitted to engage its cooperating stationary contact members. Since the movable contact member 35a of the regulating resistance 35 is connected to the shaft 70, the contact member is moved from the left-hand limiting position in which it is illustrated in a clockwise direction. The continued rotation of the motor 13 acting through elongated pinion 73 effects rotation of the gear 47 in such a direction that it is advanced along the lead screw 48 in the right-hand direction from the position in which it is shown toward the pinion 51. Since gears 73 and 65 rotate in opposite directions, the threads on opposite sides of the center of lead screw 48 are in opposite directions so that gears 47 and 50 will advance along the lead screw in the same direction.

The system is maintained in the above condition with the hoisting motor 13 operating at full speed until the cage 10 enters the landing zone, at which instant the pin 47a of the gear 47 engages the pin 51b of the pinion 51. The engagement of these two pins causes the pinion 51 to be rotated in the same direction as that in which the gear 47 is rotated with the result that the movable contact member 35a is rotated in a counter-clockwise direction from the extreme right-hand position in which it is illustrated to its left-hand position, thereby decreasing the amount of resistance in circuit between the generator 34 and the torque motor 37. As a result of this decreased resistance, the current supplied to the torque motor is correspondingly increased with the result that its torque is increased sufficiently to move the contact member 44 from the right-hand position in which it is illustrated against the tension of its spring 43 to the central position in which the movable contact member does not engage either pair of stationary contacts. The disengagement of the movable contact member 44 and its cooperating stationary contact 45 interrupts the energizing circuit for the operating coil of the hoist relay 60 which was previously traced through contacts 44 and 45. Similarly, interruption of the energizing circuit of the relay 60 causes the latter to open the energizing circuit of the hoisting contactor 17 which in turn opens to disconnect the terminals of the driving motor 13 from the supply source 15. The opening of the contactor 17 permits the movable contact member 17a to descend out of engagement with its cooperating stationary contact 17b, thereby interrupting the energizing circuit for the operating coils of the secondary contacts 23, 24, 25, and 26 which open and re-insert the resistance sections 18, 20, 21, and 22 in the secondary circuit of the driving motor 13.

If the load on the motor 13 is not an overhauling load, the speed of the motor will begin to decrease when its connections to the supply source are interrupted. Should the speed of the motor 13 decrease at a rate in excess of the predetermined rate, the voltage of the generator 34 will decrease more rapidly than the ohmic value of the rheostat 35 is decreased, thereby reducing the current supplied to the torque motor and allowing the spring 43 to pull the movable contact member 44 into engagement with its cooperating stationary members 45, thereby effecting re-establishment of the energizing circuit of relay 60 and hoist contactor 17 and consequently reconnecting the motor 13 with a supply source 15. Should the speed again exceed the predetermined rate, the movable contact member 44 is again operated to its central position and the motor 13 is again disconnected from the source 15. Thus, it is seen that in the landing zone, the resistance 35b is progressively decreased and if the driving motor 13 coasts to rest at the predetermined rate, the voltage of the generator 34 decreases at the same rate as that at which the resistance 35b is decreased with the result that the torque motor 37 maintains the movable contact member 44 in its central position aided by the magnet 46.

On the other hand, if the load on the motor 13 should be an overhauling load the speed of the motor would tend to increase when the hoisting contactor 17 is opened upon the entry of the cage 10 into the landing zone. This increase in speed of the driving motor 13 would of course cause the voltage of the generator 34 to increase, and this taken in connection with the decreasing resistance of the rheostat 35 would increase the energization of the torque motor 37 to such an extent that the movable contact member 44 will be actuated into engagement with the left-hand cooperating stationary contacts 74 to complete an energizing circuit for the operating coil of the "lowering" relay 75. This circuit is traced from the midtap of the transformer 41 through the conductor 53, operating coil of relay 75, intermediate stationary contacts of master switch 31 bridged by the movable contact member 31b, conductor 76, contact 74 bridged by contact member 44, and thence by conductor 58 to the upper terminal of the transformer 41. The relay 75 in responding to the energization of its operating coil closes its contact to complete an energizing circuit for the operating coil of the lowering contactor 16. This circuit is traced from the midtap of the transformer 41 through conductor 53, contact of control relay 75, conductor 77, left-hand stationary contact of limit switch 72 bridged by the movable contact member, conductor 78, operating coil of lowering contactor 16, and thence to the lower terminal of the transformer 41. The lowering contactor 16 closes in response to the energization of its operating coil, thereby connecting the motor 13 to the supply source 15 for rotation in the opposite direction of that in which it is rotating. This operation of disconnecting the driving motor from its supply source and rapidly reconnecting it with the supply source for rotation in the reverse direction is known as "plugging" the motor and causes the motor to exert a powerful braking torque. The speed of the motor is consequently rapidly decreased and when it reaches the correct value that it should have, corresponding to the instantaneous position of the cage 10 in the landing zone, the voltage generated by the generator 34 will have decreased sufficiently to allow the spring 43 to retract the movable contact member 44 from its left-hand position to its central position, thereby interrupting the energizing circuit for the control relay 75 and in turn deenergizing the lowering contactor 16 and finally disconnecting the motor 13 from the supply source. If the speed of the motor again exceeds the predetermined value for any instantaneous position of the cage in the landing zone, the above operation is repeated. Finally as the cage approaches its landing level, the movable contact member 35a engages the pin 71a and snaps the switch 71 from the closed to the open position in which it is illustrated, thereby interrupting the connections between the generator 34 and the torque motor 37, thus leaving the speed-controlling equipment in a reset condition.

As the cage 10 arrives level with its landing, the movable contact member of the limit switch 57 is actuated out of engagement with its cooperating stationary contacts. The disengagement of the left-hand section of the movable contact member from its cooperating stationary contact 63 interrupts the energizing circuit of the brake-operating coil which circuit was previously traced through these contacts. This allows the brake spring or weight to set the shoe against the drum and thereby bring the equipment to rest.

To reverse the above-described operation; i. e., to hoist the cage 11 and lower the cage 10, it is only necessary to depress the master switch 32. From this point on, the operation is exactly the same as that previously described with the exception that the functions previously performed by the gear 47 are now performed by the gear 50 and similarly the functions performed by the relay 60 and the limit switch 57 are now performed by the relay 75 and the limit switch 72. Since the operation is otherwise identical with that already described, it is believed unnecessary to repeat the description of the operation.

Although in accordance with the provisions of the patent statutes this invention is described as embodied in concrete form, it will be understood that the apparatus and connections shown and described are merely illustrative and that the invention is not limited thereto since alterations and modifications will readily suggest themselves to persons skilled in the art without departing from the true spirit of this invention or from the scope of the annexed claims.

What I claim as new and desire to secure by Letters Patent of the United States, is:

1. A control system comprising in combination an electric motor, means actuated by said motor for producing a voltage variable in accordance with the speed and amount of rotation of said motor, and means controlled by said voltage for controlling said motor.

2. A control system comprising in combination an electric motor, an element driven by said motor, means for producing a voltage varying in accordance with the speed of said motor and the position of said element, and means responsive to said voltage for controlling said motor.

3. A control system comprising in combination an electric motor, an element driven by said motor, means driven by said motor for producing a voltage proportional to the speed thereof, means for modifying said voltage in accordance with the position of said element, and means controlled by said modified voltage for controlling said motor.

4. A control system for hoists and the like comprising a cage, an electric motor for driving said cage, reversing means for said motor, means for producing a voltage varying with the speed of said motor, means for modifying said voltage in accordance with the position of said cage, and means responsive to a predetermined value of said modified voltage for actuating said reversing means to plug said motor.

5. A control system comprising an electric motor, a dynamo-electric machine driven by said motor for producing a voltage proportional to the speed of said motor, a resistance connected in circuit with said generator and varied in accordance with the amount of rotation of said motor for modifying said voltage, and means responsive to said modified voltage for controlling said motor.

6. A control system and the like comprising a load element, an electric motor for driving said element, reversing means for said motor, a generator driven by said motor for producing a voltage varying with the speed thereof, a variable resistance connected in circuit with said generator, means for varying said resistance thereby to modify said voltage in accordance with the position of said load element and means responsive to said modified voltage for controlling said reversing means.

7. A control system and the like comprising a load element, an electric motor for driving said element, reversing means for said motor, a generator driven by said motor for producing a voltage varying with the speed of said motor, a variable resistance connected in circuit with said generator, means for varying said resistance so as to control said voltage in accordance with the position of said element, and a torque motor responsive to said voltage for controlling said reversing means to cause said motor to exert a plugging torque.

8. A control system for hoists and the like comprising a cage, an electric motor for driving said cage, reversing switching means for said motor, and means for effecting a predetermined speed of said motor at each point in the landing zone of said cage comprising a generator driven by said motor for producing a voltage proportional to the speed of said motor, a variable resistance connected in circuit with said generator, means for varying said resistance to control said voltage, and a torque motor responsive to said voltage for controlling said reversing means to cause said motor to exert a plugging torque when the speed thereof exceeds the predetermined value for any instantaneous position of said cage in said landing zone and for causing said motor to exert a driving torque when the speed thereof becomes less than the predetermined value for any instantaneous position of said cage in the landing zone.

9. A control system for hoists and the like comprising in combination with a cage an electric motor for driving said cage, a pair of reversing contactors for connecting said motor to the line for operation in reverse direction, and means for effecting a predetermined deceleration of said motor in the landing zone of the travel of said cage comprising a generator driven by said motor for producing a voltage proportional to the speed thereof, a variable resistance connected in circuit with said generator, means actuated in accordance with the position of said cage for varying said resistance to modify said voltage, and a torque motor responsive to said modified voltage for selectively actuating said contactors selectively to produce plugging and driving torques of said motor when the instantaneous speed of said motor is respectively above or below the predetermined correct speed for the instantaneous position of said cage in said landing zone.

HENRY W. CHADBOURNE.